United States Patent
Retersdorf et al.

(10) Patent No.: US 11,465,770 B2
(45) Date of Patent: Oct. 11, 2022

(54) AIR CYCLE MACHINE CONNECTED TO ENGINE GEARBOX

(71) Applicant: Hamilton Sundstrand Corporation, Charlotte, NC (US)

(72) Inventors: Alan Retersdorf, Avon, CT (US); Gregory L. DeFrancesco, Simsbury, CT (US); Matthew Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 767 days.

(21) Appl. No.: 16/290,368

(22) Filed: Mar. 1, 2019

(65) Prior Publication Data
US 2020/0277079 A1  Sep. 3, 2020

(51) Int. Cl.
*B64D 41/00* (2006.01)
*B64D 13/06* (2006.01)
*F01D 13/00* (2006.01)
*B64D 13/02* (2006.01)

(52) U.S. Cl.
CPC ........... *B64D 41/007* (2013.01); *B64D 13/02* (2013.01); *B64D 13/06* (2013.01); *F01D 13/003* (2013.01); *B64D 2013/0618* (2013.01); *B64D 2013/0644* (2013.01); *B64D 2013/0648* (2013.01); *B64D 2041/002* (2013.01)

(58) Field of Classification Search
CPC .................... B64D 13/02; B64D 13/06; B64D 2013/0648; B64D 2013/0603; B64D 41/007
See application file for complete search history.

(56) References Cited

U.S. PATENT DOCUMENTS

| | | | | |
|---|---|---|---|---|
| 3,171,252 A | * | 3/1965 | Trowbridge | F02C 7/277 60/788 |
| 4,251,987 A | * | 2/1981 | Adamson | F02K 3/04 60/805 |
| 6,663,044 B1 | * | 12/2003 | Munoz | B64D 13/06 244/118.5 |
| 6,776,002 B1 | * | 8/2004 | Ho | F02C 7/32 62/401 |
| 7,624,592 B2 | | 12/2009 | Lui et al. | |
| 2001/0025507 A1 | | 10/2001 | Buchholz et al. | |
| 2010/0146967 A1 | | 6/2010 | Simpson et al. | |
| 2017/0363098 A1 | * | 12/2017 | Taylor | F01D 15/08 |

(Continued)

FOREIGN PATENT DOCUMENTS

| EP | 2455597 A2 | 5/2012 |
|---|---|---|
| EP | 3263845 A1 | 1/2018 |

(Continued)

OTHER PUBLICATIONS

Extended European Search Report; Application No. 19209265.8; dated Jun. 23, 2020; 13 pages.

*Primary Examiner* — Ko-Wei Lin
(74) *Attorney, Agent, or Firm* — Cantor Colburn LLP

(57) ABSTRACT

Disclosed is an air cycle machine (ACM) having: a turbine; a compressor; a compressor shaft connected to the compressor and configured to receive rotational energy from a gearbox; and a turbine shaft connected to the turbine and configured to provide rotational energy to the gearbox; wherein the turbine shaft and the compressor shaft operate at different rotational speeds.

15 Claims, 4 Drawing Sheets

(56) References Cited

U.S. PATENT DOCUMENTS

| | | | | |
|---|---|---|---|---|
| 2018/0172012 A1* | 6/2018 | Plante | ........................ | F02C 7/36 |
| 2019/0009912 A1* | 1/2019 | Matsui | ................... | B64D 13/08 |
| 2019/0383220 A1* | 12/2019 | Mackin | ................ | B64D 15/166 |
| 2020/0141327 A1* | 5/2020 | Redford | .................... | F02C 3/04 |

FOREIGN PATENT DOCUMENTS

| | | | |
|---|---|---|---|
| EP | 3489488 | A1 | 5/2019 |
| EP | 3546363 | A1 | 10/2019 |

\* cited by examiner

AIR CYCLE MACHINE CONNECTED TO ENGINE GEARBOX

STATEMENT OF FEDERAL SUPPORT

This invention was made with Government support under contract FA8650-16-D-2617 awarded by the United States Airforce. The Government has certain rights in the invention.

BACKGROUND

Exemplary embodiments pertain to the art of air cycle machines (ACM) and, more specifically, to a turbine-compressor ACM connected to an engine gearbox.

An air cycle machine (ACM) is the refrigeration unit of the environmental control system (ECS) used in pressurized gas turbine powered aircraft. An aircraft may have multiple ACMs, each of which may be referred to as an air conditioning pack.

In general, an ACM includes a turbine and a compressor connected by a shaft. Air from the compressor of a gas turbine engine is provided to the ACM compressor. After passing through the ACM compressor the air is provided to the ACM turbine. The turbine is configured to extract work W from the bleed airflow received from a RAM air system or the compressor of a gas turbine engine. As the bleed air flow traverses the turbine it expands and causes the turbine and the connected shaft to rotate. This rotation, in turn, drives the compressor to produce compressed air. In particular, as will be appreciated by those of skill in the art in view of the present disclosure, operative connection of the turbine to the compressor enables the turbine to power the compressor using work W extracted from the bleed air flow as the bleed air flow traverses the turbine. Such systems can limit the efficiency loss associated with bleeding a portion of the compressed gas flow generated by the compressor of a gas turbine engine.

BRIEF DESCRIPTION

Disclosed is an air cycle machine (ACM) comprising: a turbine; a compressor; a compressor shaft connected to the compressor and configured to receive rotational energy from a gearbox; and a turbine shaft connected to the turbine and configured to provide rotational energy to the gearbox; the ACM being configured such that the turbine shaft and the compressor shaft can operate at different rotational speeds.

In addition to one or more of the above disclosed features, or as alternate, the ACM includes a primary heat exchanger fluidly connected upstream of the compressor.

In addition to one or more of the above disclosed features, or as alternate, the ACM includes a secondary heat exchanger fluidly connected between the compressor and the turbine.

Further disclosed is an aircraft system with an ACM that, in addition to one or more of the above disclosed features, or as alternate, includes a load heat exchanger fluidly connected to the ACM downstream of the turbine.

In addition to one or more of the above disclosed features, or as alternate, the aircraft system includes an exhaust port and aircraft system electronics, wherein the exhaust port and the aircraft system electronics are fluidly connected to the ACM downstream of the load heat exchanger.

In addition to one or more of the above disclosed features, or as alternate, the aircraft system includes a gearbox, wherein the gearbox is operationally connected to the compressor shaft and the turbine shaft.

In addition to one or more of the above disclosed features, or as alternate, the gearbox comprises a plurality of mounting pads and wherein each of the plurality of shafts is connected to respective one of the plurality of mounting pads.

In addition to one or more of the above disclosed features, or as alternate, the gearbox is configured for rotationally connecting with the respective plurality of shafts, through the respective plurality of mounting pads, with a respective plurality of gear ratios.

In addition to one or more of the above disclosed features, or as alternate, the aircraft system includes a gas powered turbine, wherein the primary first heat exchanger is configured to receive bleed air from the gas powered turbine.

In addition to one or more of the above disclosed features, or as alternate, the gas powered turbine is at least one of a gas turbine engine and an auxiliary power unit.

In addition to one or more of the above disclosed features, or as alternate, the gas powered turbine is a gas turbine engine and the gearbox is an accessory gearbox operationally connected to the gas turbine engine.

In addition to one or more of the above disclosed features, or as alternate, the gas turbine engine is operationally connected to the accessory gearbox through a tower shaft.

In addition to one or more of the above disclosed features, or as alternate, the aircraft system is configured to transfer power from the turbine of the ACM to the gas turbine engine through the accessory gearbox and the tower shaft.

In addition to one or more of the above disclosed features, or as alternate, the aircraft system includes an environmental control system (ECS), the ECS including a mixing chamber, wherein the ACM fluidly communicates air to the mixing chamber.

Further disclosed is an aircraft having an ECS, wherein in addition to one or more of the above disclosed features, or as alternate, the aircraft comprises a cockpit; wherein the ECS is configured for directing air from the mixing chamber to one or more of the cockpit, the aircraft system electronics and the exhaust port.

Further disclosed is a method of transferring energy with an aircraft accessory gearbox, the method comprising: transferring rotational energy to a first shaft, the first shaft being rotationally coupled to a compressor of an air cycle machine (ACM); receiving energy from a second shaft, the second shaft being rotationally coupled to a turbine of the ACM; and the ACM being configured such that the turbine shaft and the compressor shaft can operate at different rotational speeds.

In addition to one or more of the above disclosed features and/or steps, or as alternate, the method includes receiving rotational energy at the compressor from a first gearbox coupling configured at a first gear ratio and transferring rotational energy from the turbine to a second gearbox coupling configured at a second gear ratio.

In addition to one or more of the above disclosed features and/or steps, or as alternate, the method includes receiving rotational energy for the ACM compressor from a gas turbine and transferring rotational energy from the ACM turbine to the gas turbine, the gas turbine being a gas turbine engine.

In addition to one or more of the above disclosed features and/or steps, or as alternate, the method includes receiving rotational energy for the ACM compressor from an accessory gearbox connected to a gas turbine engine through a tower shaft.

In addition to one or more of the above disclosed features and/or steps, or as alternate, the method includes transferring rotational energy from the ACM turbine to an accessory gearbox connected to a gas turbine engine through a tower shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
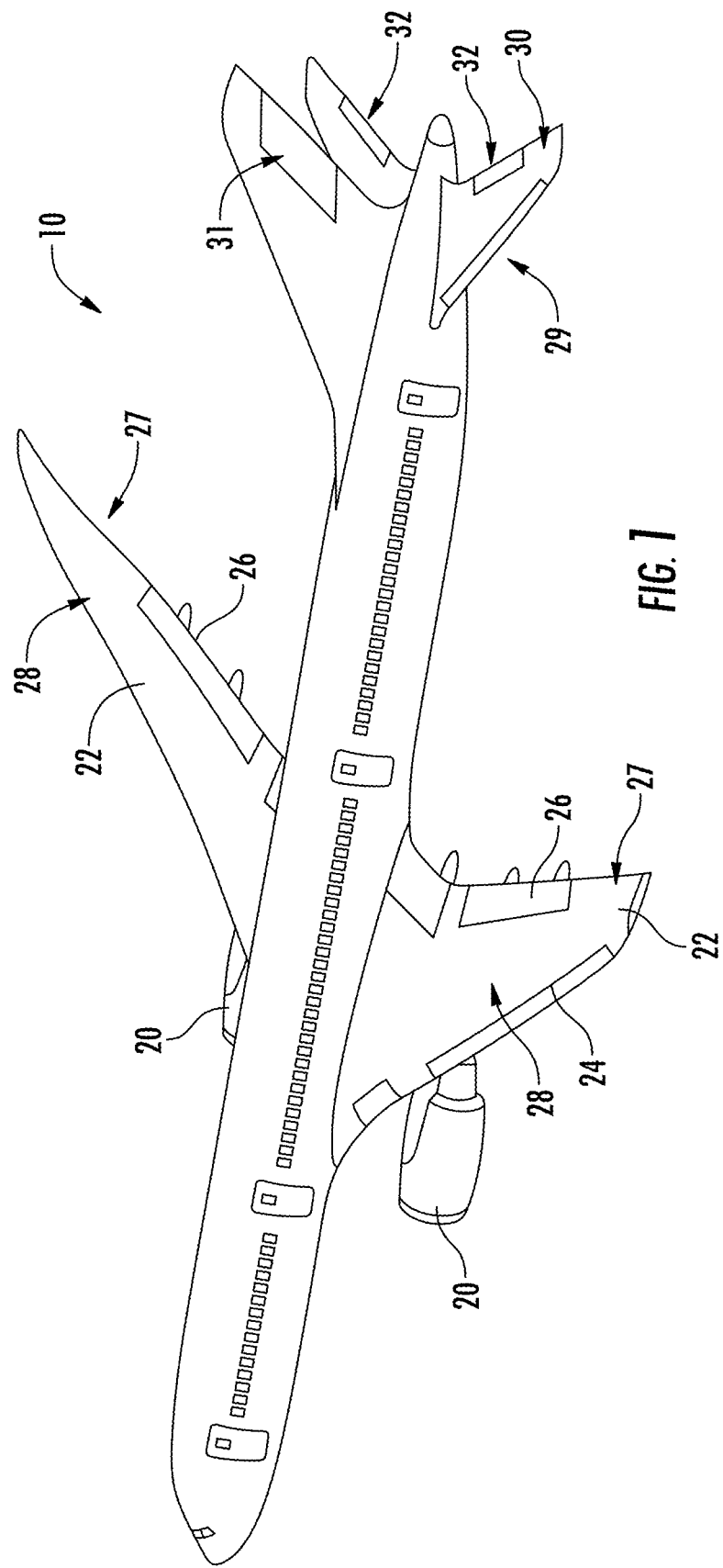
FIG. 1 is a perspective view of an aircraft where embodiments of the present invention can be implemented.
Figure 2:
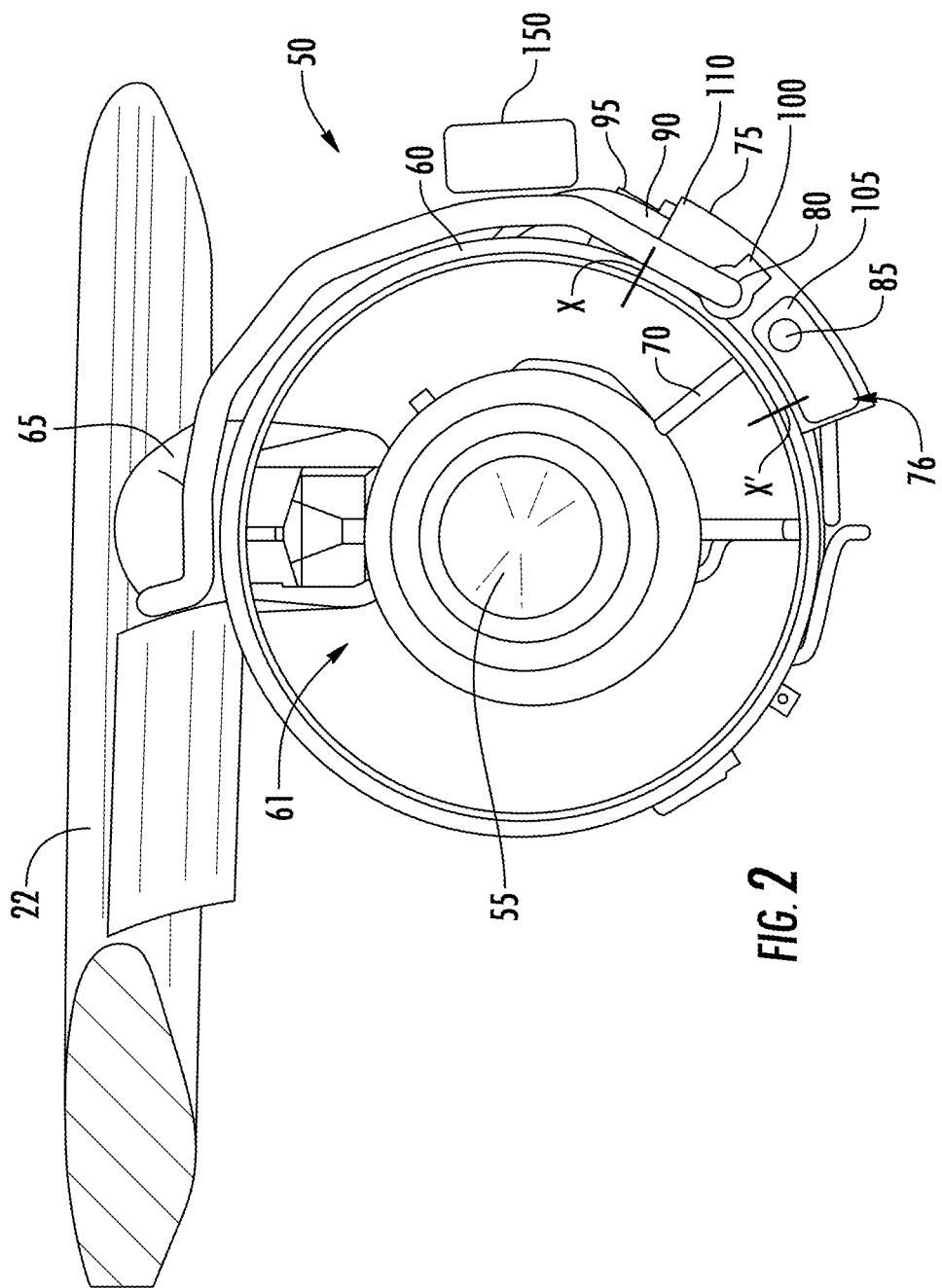
FIG. 2 is a front view of a gas turbine engine for an aircraft where embodiments of the present invention can be implemented, wherein an accessory gearbox, components driving the accessory gearbox, and components driven by the accessory gearbox are illustrated.
Figure 3:
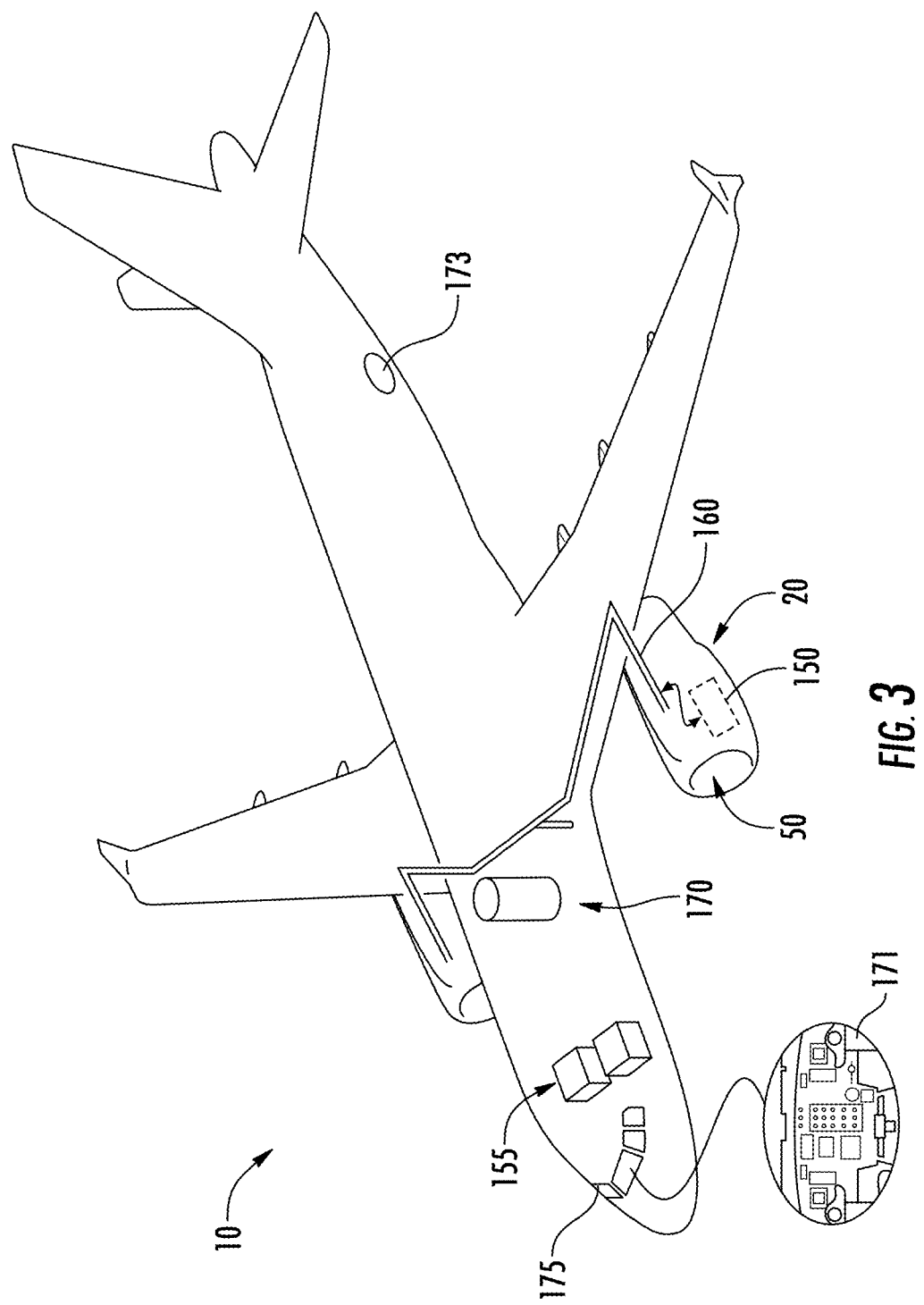
FIG. 3 is another perspective view of an aircraft where embodiments of the present invention can be implemented, wherein certain components associated with refrigeration cycles are illustrated including an air cycle machine (ACM)

FIGS. 1-3 illustrate features of an aircraft where embodiments of the disclosed embodiments may be implemented. FIG. 1 illustrates an example of a commercial aircraft 10 having aircraft engines surrounded by (or otherwise carried in) a nacelles 20 housing therein a gas turbine engine. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems.

Turning to FIG. 2, a front view of a gas turbine engine 50 of the type that may be housed within the nacelles 20. The turbine engine 50 of FIG. 2 includes an engine core 55 and an outer shell 60 of a bypass duct 61. The core 55 is structurally connected to the wing 22 through a pylon 65. During operation, the core 55 may drive a driveshaft 70, which may be a tower shaft, and which may drive a gear train of an accessory gearbox 75. The example driveshaft 70 may extend radially at a circumferential position between a four o'clock position X and five o'clock position X'.

The gearbox 75 may drive a plurality of accessories 76, such as a starter 80, an aircraft generator 85, a hydraulic pump 90, and an engine oil pump 95. The plurality of accessories 75 may connect with the gearbox 75 through a respective plurality of mounting pads (alternatively referred to as gearbox couplings) such one mounting pad 100 for the starter 80, another mounting pad 105 for the generator 85 and a further mounting pad 110 for the oil pump 95. The plurality of accessories 76 may require a respective plurality of rotational speeds in order to achieve optimal design performance. In order to obtain the respective plurality of rotational speeds, each of the plurality of mounting pads 100, 110 may have a different gear ratio, for example, by connecting with a different gear or set of gears within the gearbox 75. It is to be appreciated that the accessories 76 develop parasitic loads on the engine 50 because power used for driving the accessories 76 comes from the engine 50.

Turning to FIG. 3, an aircraft 10 powered by a gas turbine engine within the nacelles 20 may include an environmental control system (ECS) which may include at least one air cycle machine (ACM) 150 (illustrated schematically in FIGS. 2 and 3) with at least one ACM controller 155. The ACM 150 is a refrigeration unit of the ECS that is often referred to as an air conditioning pack. The ACM 150 may receive bleed air from one or more bleed lines 160 connected to a respective one or more of the gas turbine engines 50 within the nacelles 20. An ACM 150 that receives bleed air from gas powered turbines (such as engines or APUs) may be referred to as a turbine-compressor ACM. Conditioned air from the ACM 150 may be sent to a mixing chamber 170.

From the mixing chamber 170, air may be distributed in the aircraft systems, such as to cool aircraft system electronics 171 as well as to provide conditioned air to habitable spaces in the aircraft 10, such as an aircraft cockpit 175. Air may also be exhausted through an aircraft exhaust port 173.

Figure 4:
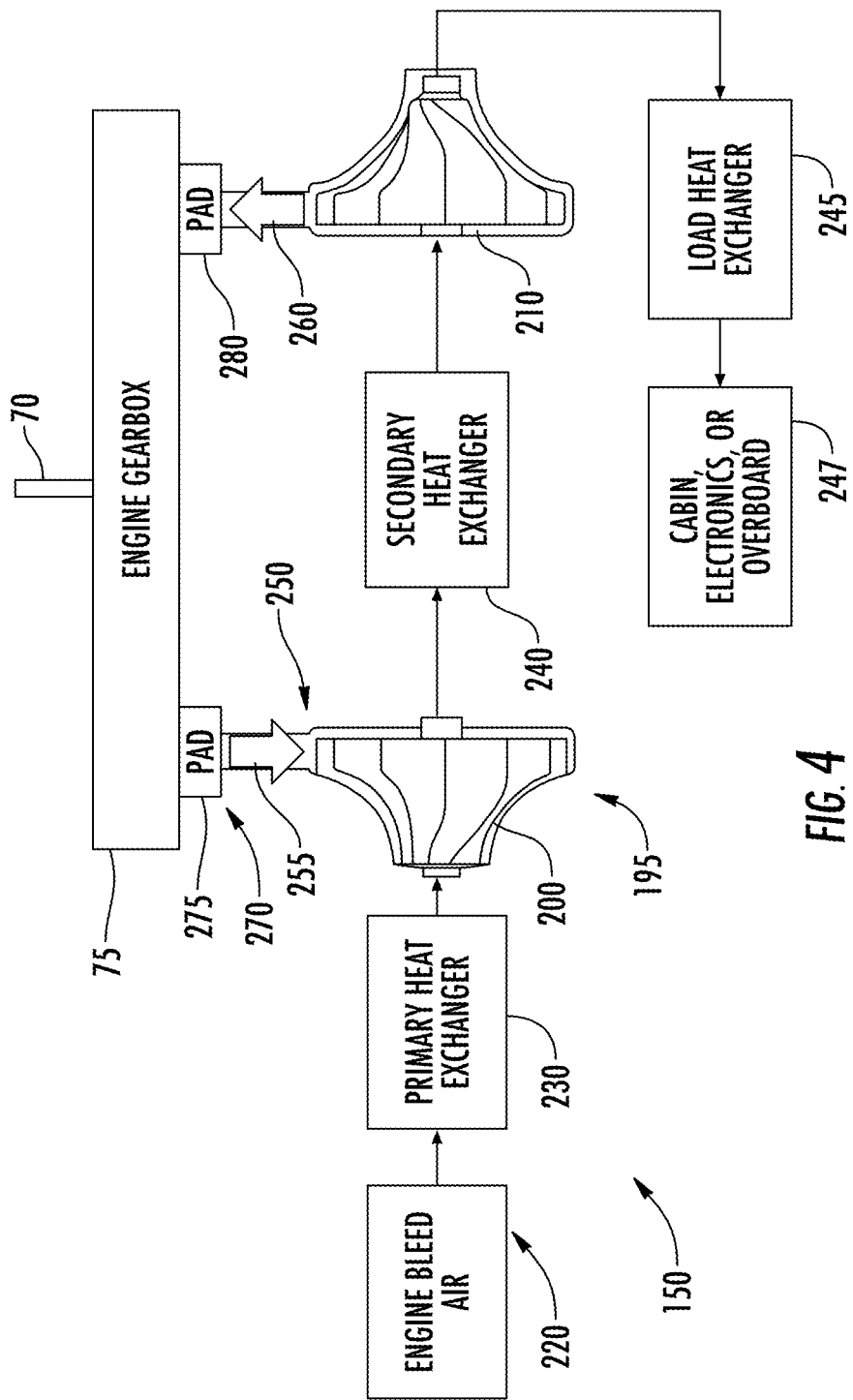
FIG. 4 schematically illustrates an ACM according to an embodiment.

Turning now to FIG. 4, an ACM 150 is illustrated according to a disclosed. The illustrated ACM 150 includes a plurality of rotary components 195 including a compressor 200 and a turbine 210. In conventional configurations where similar rotary components are tied to a same rotary shaft, there may be occasions where an optimal design of one of these components leads to a sub-optimal design of another one of these components. This may be a result of differing optimal rotational requirements for a compressor as compared with a turbine, for example due to the different sizing of such components.

Turning to FIG. 4 and according to the disclosed embodiments, the rotary components 195 exchange rotary power with a gearbox such as the engine accessory gearbox 75. Thus, the compressor 200 and turbine 210 are rotationally decoupled from each other inside of the disclosed ACM 150. This configuration may allow for independently optimal designs of the different rotary components 195 in the ACM 150, increasing overall efficiency of the aircraft operation. That is, in embodiments herein, the compressor and turbine are rotationally coupled to the accessory gearbox 75 and not directly to each other by a common shaft within the ACM 150 as in conventional systems.

As illustrated in FIG. 4, compression, cooling and expansion seen in typical refrigeration cycles may be accomplished in the ACM 150 by a plurality of rotary components 195 including a compressor 200 and a turbine 210. In addition, such refrigeration cycles may include a plurality of heat exchangers 220, including a primary heat exchanger 230 and a secondary heat exchanger 240, both of which may be air to air heat exchangers. Specifically, bleed air is directed into the primary heat exchanger 230. Outside air at ambient temperature and pressure may be used as the coolant in this heat exchanger 230. Once the air has been cooled, it may then compressed by the compressor 200. Pre-cooling through the first heat exchanger 230 may increase efficiency of the ACM 150 because it lowers the temperature of the air entering the compressor 200, so that less energy may be required to compress a given air mass. The compression heats the air, which is sent to the secondary heat exchanger 240, which may again use outside air as the coolant. The compressed, cooled air then travels through the turbine 210 which extracts energy from the air as it expands and the extracted energy may be used for various purposes.

The air may now be combined in the mixing chamber 170 and processed through a load heat exchanger 24 with a small amount of non-conditioned bleed air to warm the air to a desired temperature. The air may then be vented into the cabin 175, to aircraft system electronics, or overboard (collectively illustrated as 247 in FIG. 4), though such uses are not intended to be limiting.

As illustrated in FIG. 4 and indicated above, the disclosed embodiments provide an architecture for a turbine-compressor ACM that enables the use of different rotational speeds for each of the compressor 200 and the turbine 210. In one embodiment, the compressor 200 and the turbine 210 are connected to an engine gearbox such as the accessory gearbox 75 on respective one of a plurality of rotational shafts 250, including a first shaft 255 defining a first gearbox coupling for the ACM 150 and a second shaft 260 defining a separate gearbox coupling for the ACM 150. The first shaft 255, operatively connected to the compressor 200, may be referred to as a compressor shaft, and the second shaft 260, operatively connected to the turbine 210, may be referred to herein as a turbine shaft. Each of the plurality of shafts 250 may be connected to the gearbox 75 through a respective one of a plurality of mounting pads 270 including a first mounting pad 275 and a second mounting pad 280. Each of the plurality of mounting pads 275, as indicated above, may have a different gear ratio, for example, by connecting with a different gear or set of gears within the gearbox 75.

Benefits of the configuration of FIG. 4 include allowing the compressor 200 and the turbine 210 to be designed independently to achieve desired performance efficiencies because they are not directly connected to one another by a single shaft. Such performance efficiencies may be obtained even though the compressor 200 and the turbine 210 may have differing rotational speed requirements. Additionally, the configuration illustrated in FIG. 4 may remove a need for balancing power and torque between the rotary components. In one embodiment, a portion of power obtained from the turbine 210 in the turbine-compressor ACM 150 may be transmitted back to the engine 50 through the accessory gearbox 75.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft system comprising:
an air cycle machine (ACM) having:
a turbine;
a compressor;
a compressor shaft connected to the compressor and configured to receive rotational energy from a gearbox;
a turbine shaft connected to the turbine and configured to provide rotational energy to the gearbox; the ACM being configured such that the turbine shaft and the compressor shaft operate at different rotational speeds;
a load heat exchanger fluidly connected to the ACM downstream of the turbine; and
an exhaust port and aircraft system electronics, wherein the exhaust port and the aircraft system electronics are fluidly connected to the ACM downstream of the load heat exchanger.

2. The aircraft system of claim 1, wherein the ACM, comprising a primary heat exchanger fluidly connected upstream of the compressor.

3. The aircraft system of claim 2, wherein the ACM, comprising a secondary heat exchanger fluidly connected between the compressor and the turbine.

4. The aircraft system of claim 1, wherein the gearbox is operationally connected to the compressor shaft and the turbine shaft.

5. The aircraft system of claim 4, wherein the gearbox comprises a plurality of mounting pads and wherein each of the compressor shaft and the turbine shafts is connected to respective one of the mounting pads.

6. The aircraft system of claim 5, wherein the gearbox is configured for to rotationally connect with each of the compressor shaft and the turbine shaft through the respective one of the mounting pads with a respective gear ratios.

7. The aircraft system of claim 1, comprising a gas powered turbine, wherein the primary first heat exchanger is configured to receive bleed air from the gas powered turbine.

8. The aircraft system of claim 7, wherein the gas powered turbine is a gas turbine engine.

9. The aircraft system of claim 8, wherein the gearbox is an accessory gearbox operationally connected to the gas turbine engine.

10. The aircraft system of claim 9, wherein the gas turbine engine is operationally connected to the accessory gearbox through a tower shaft.

11. The aircraft system of claim 10, wherein the aircraft system is configured to transfer power from the turbine of the ACM to the gas turbine engine through the accessory gearbox and the tower shaft.

12. The aircraft system of claim 11, comprising an environmental control system (ECS), the ECS including a mixing chamber, wherein the ACM fluidly communicates air to the mixing chamber.

13. An aircraft comprising the aircraft system of claim 12, and further comprising:
a cockpit, wherein the ECS is configured for directing air from the mixing chamber to one or more of the cockpit, the aircraft system electronics and the exhaust port.

14. A method of transferring energy with an aircraft accessory gearbox the method comprising:

transferring a first rotational energy to a first shaft from the gearbox, the first shaft being rotationally coupled to a compressor of an air cycle machine (ACM);

transferring a second rotational energy from a second shaft to the gearbox, the second shaft being rotationally coupled to a turbine of the ACM, wherein the ACM is configured such that the turbine shaft and the compressor shaft operate at different rotational speeds; and receiving a first rotational energy for the compressor of the ACM from a gas turbine and transferring a second rotational energy from the turbine of the ACM to the gas turbine, the gas turbine being a gas turbine engine or an auxiliary power unit.

15. The method of claim 14, further comprising receiving a first rotational energy at the compressor from a first gearbox coupling configured at a first gear ratio and transferring a second rotational energy from the turbine to a second gearbox coupling configured at a second gear ratio.

\* \* \* \* \*